United States Patent [19]

Betton

[11] Patent Number: 4,594,480
[45] Date of Patent: Jun. 10, 1986

[54] APPARATUS FOR AUTOMATICALLY CHECKING THE CORRESPONDENCE BETWEEN THE NUMERICAL CODES OF TELEPHONE SUBSCRIBERS AND THE DIFFERENT TRANSMISSION AND DISTRIBUTION IDENTIFICATION CODES OF THE TELEPHONE PAIR ASSIGNED TO EACH SUBSCRIBER

[75] Inventor: Claude Betton, Veneux les Sablons, France

[73] Assignee: Spie Batignolles, Puteaux, France

[21] Appl. No.: 644,958

[22] Filed: Aug. 28, 1984

[30] Foreign Application Priority Data

Sep. 2, 1983 [FR] France .................................. 83 14064

[51] Int. Cl.⁴ ............................................... H04B 3/46
[52] U.S. Cl. ...................... 179/175.3 R; 179/175.3 A
[58] Field of Search ................... 179/175.2 C, 18 FH, 179/175.3 R, 175.3 F, 175.3 A, 27 DB; 324/6 G

[56] References Cited

U.S. PATENT DOCUMENTS

| | | | |
|---|---|---|---|
| 3,891,811 | 6/1975 | Miller | 179/175.3 A |
| 3,973,090 | 8/1976 | Miller | 179/175.3 A |
| 4,208,553 | 6/1980 | Kaplan | 179/175.3 A |

Primary Examiner—Stafford D. Schreyer

[57] ABSTRACT

The automatic testing apparatus is connected to a power supply system and to the connecting terminal of transmission and distribution lines of a subdistribution frame in a telephone installation. The apparatus comprises a keyboard for successively entering the numerical codes and constitution numbers of the technical subscriber-file to be checked, connectors to be joined to the terminals of the subdistribution frame, a test unit comprising a programmed microprocessor for storing the entered data and initiating transmission of a coded signal to the transmission and distribution cables of the telephone pairs to be tested. This signal is tested in order to check whether the designated constitution is correct or not in the corresponding pairs of the transmission and distribution cable terminals of the subdistribution frame, the results of the test being then displayed on a printer.

19 Claims, 7 Drawing Figures

FIG_1

FIG_2

FIG_3

FIG_4

APPARATUS FOR AUTOMATICALLY CHECKING THE CORRESPONDENCE BETWEEN THE NUMERICAL CODES OF TELEPHONE SUBSCRIBERS AND THE DIFFERENT TRANSMISSION AND DISTRIBUTION IDENTIFICATION CODES OF THE TELEPHONE PAIR ASSIGNED TO EACH SUBSCRIBER

BACKGROUND OF THE INVENTION

1. Field of the Invention

The present invention relates to an apparatus for automatically controlling the correspondence between the numerical codes of telephone subscribers (subscriber numbers) and the different transmission and distribution identification codes of the telephone pair assigned to each subscriber.

2. Description of the Prior Art

It is known that a subscriber line consists of two wires forming a telephone pair. This pair is continuous from the main distributing frame in the telephone exchange or central office to the subscriber's telephone set. Said pair establishes a route via the following two cables:

a transmission cable which extends between the main distributing frame and the subdistribution frame (subdistributor);

a distribution cable which extends between the subdistribution frame and the subscriber's telephone set.

All the cable pairs have an identification code, namely a transmission code and a distribution code. Each of these two identification codes is designated as a "constitution". In consequence, there are two constitutions for each individual telephone number.

For example, in the case of a subscriber number such as 739 33 20, there is a corresponding transmission identification code such as 152.10.6 and a distribution identification code such as 2.12.4.

All these identification codes are listed in a file known in France as the "technical subscriber-file".

It is apparent that this file must provide an absolutely faithful record of the state of the main distributing frame and of the subdistributors which are dependent on the main frame.

In consequence, updating of said file is necessary after each modification carried out on the telephone system. Especially when connecting new subscribers, it is found that, if identification of new cable pairs has not been followed-up, the result is a slow but inexorable disorganization of the technical subscriber-file.

According to French postal administration sources, the percentages of error of these files can attain 35%, thus entailing the need for total file reorganization at periodic intervals.

This operation consists in following by hand the jumper wires (cross-connections) which establish connections on the one hand within the subdistribution frames between the different transmission cable terminals and the different distribution cable terminals and, on the other hand, within the main distributing frame, between the different transmission cable terminals and the different subscriber numbers.

This operation is at present performed entirely by hand, is both tedious and time-consuming, and is in fact regarded as a punishment by operators. Furthermore, this manual operation is not wholly devoid of errors.

SUMMARY OF THE INVENTION

The aim of the present invention is to overcome the disadvantages mentioned in the foregoing by producing an apparatus for automatically checking the correspondence between the numerical codes of telephone subscribers and the different transmission and distribution identification codes of the pair assigned to each subscriber, thus permitting automatic, periodic and error-free updating of technical subscriber-files.

The apparatus contemplated by the invention is intended to be connected to a power supply source and to the connecting terminals of the transmission and distribution lines of a subdistribution frame.

In accordance with the invention, said apparatus is distinguished by the fact that it comprises:

means for successively entering into the apparatus the numerical codes and constitution numbers of subscribers of the technical file to be checked;

connectors to be attached to the terminals of a subdistribution frame;

a test unit comprising a microprocessor which is programmed for storing the data entered into the apparatus and for initiating transmission of a coded signal to the transmission and distribution cables of the pairs to be tested, means for detecting said signal in order to check whether the designated constitution is correct or not in the corresponding pairs of the transmission and distribution cable terminals of the subdistribution frame;

means for displaying the results of said test.

In order to employ the apparatus in accordance with the invention, it is only necessary to join the connectors of the apparatus to the terminals of the subdistribution frame and to enter into the apparatus in succession the numerical codes and the constitution numbers of subscribers of the technical file to be checked.

The test unit stores in memory the data entered into the apparatus, automatically initiates transmission of coded signals to the pair to be tested and detects this signal in order to check whether the designated constitution is correct or not. The results of this test are displayed directly and preferably on a printer which automatically prints these results on the technical subscriber-file.

In a preferred embodiment of the apparatus, the means for entering data relating to the numerical codes and constitutions of subscribers comprises a keyboard having numbered keys for entering the subscriber's numerical code and constitution numbers and keys for selecting the following programs:

a program for entering the numerical codes and constitution numbers of subscribers;

a program for specification of correspondence of subdistribution-frame terminals;

a program of continuity tests;

a program for assignment of a terminal for transmission or distribution;

a program for returning to the start-of-cycle position.

In an advantageous embodiment of the invention, the apparatus comprises a module for decoding the data entered into the apparatus by means of the keyboard and storing said data in a buffer memory and the microprocessor is programmed for reading this buffer memory and storing the data in a working memory. In order to check for correspondence between the numerical codes and the constitution numbers and the pairs to be tested, the apparatus comprises means for checking the presence of a voltage between the programmed distribution and transmission pairs by means of the keyboard.

The apparatus in accordance with the invention is preferably provided in addition with means for testing the calling subscriber's service line in order to check the existence of a frequency corresponding to the tone signal during a predetermined period of time, means for checking the detection of a zero frequency in the transmission and distribution pairs at the called subscriber's end, means for storing in memory the numerical codes of the subscriber and for detecting the existence of a predetermined frequency on the calling subscriber's service line and for initiating the printing of the result of this test on the printer if the time-duration of the signal corresponding to the aforementioned frequency exceeds a predetermined value, which indicates that the system is saturated, and means for detecting whether the subscriber of the pair to be tested is busy.

The test unit of the apparatus in accordance with the invention preferably comprises in addition a keyboard card equipped with a 2K-octet random-access memory (RAM) for storing the data relating to the results of tests. The control unit further comprises a circuit which has the function of processing the data delivered by the data input means in order to convert said data to ASCII values and to form the interface with the data bus of the system. Provision is also made for a control card, a filtering card, a subdistributor connection card and selecting cards each coupled to the connectors to be attached to the terminals of the subdistribution frame. The control card is provided with means for addressing the selecting cards in order to generate the signals employed by the filtering card and the subdistributor connection card and in order to record the data delivered by the filtering card.

In a preferred embodiment of the invention, the control card comprises two parallel peripherals for interfacing the bus of the system with the cards for receiving the external signals, one of said peripherals being connected to the filtering card and the other peripheral being connected to a parent selecting card which serves as a support for the selecting cards.

The subdistributor connection card comprises a relay for line connection and numbering, a relay for switching a frequency detector to the transmission or distribution pair and relays for simulating lifting of the telephone receiver for transmission or distribution.

BRIEF DESCRIPTION OF THE DRAWINGS

These and other features of the invention will be more apparent upon consideration of the following description and accompanying drawings, wherein.

DETAILED DESCRIPTION OF THE INVENTION

Figure 1:
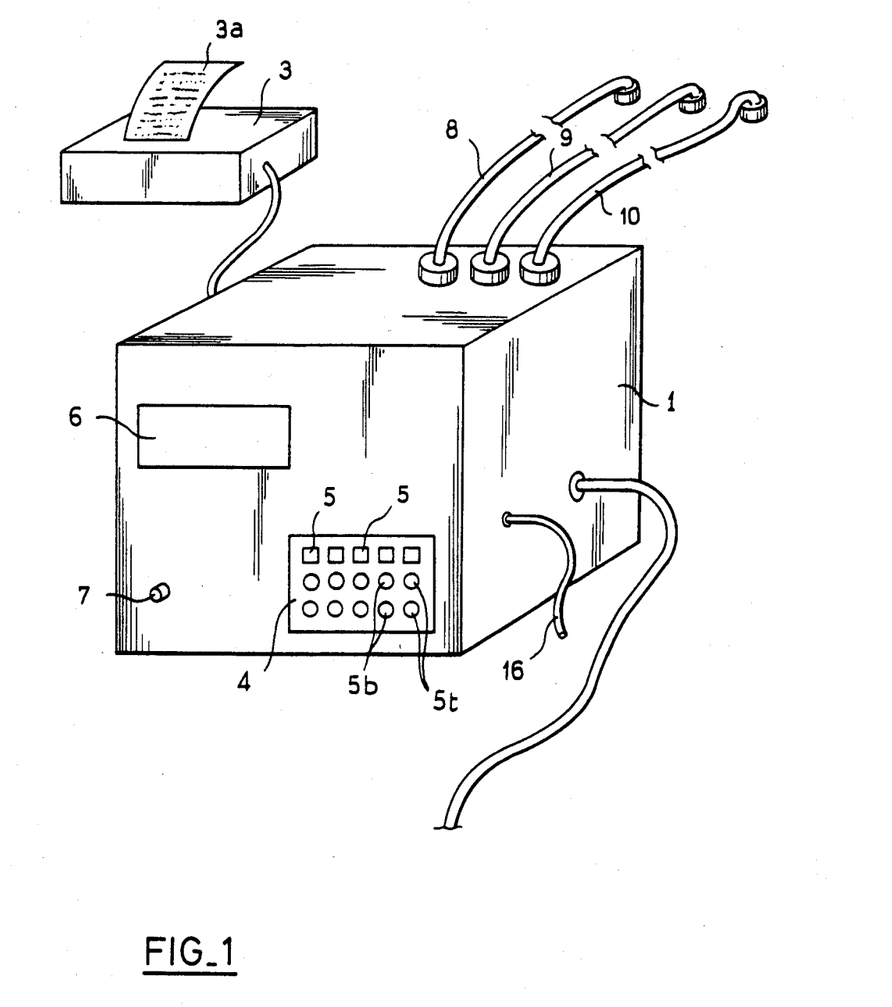
FIG. 1 is a view in schematic perspective showing the complete apparatus in accordance with the invention.

The intended function of the apparatus illustrated in FIG. 1 is to check the correspondence between a subscriber's number and the different telephone-system cable identification numbers of the two wires or so-called pairs which are assigned to said number.

This apparatus comprises a console 1 containing a test unit which will be described in detail hereinafter. Said test unit is connected to a printer 3 and to a power supply which converts the 220-volt supply of the grid system to direct-current voltages respectively of +5 volts and +15 volts.

The front face of the console 1 comprises a keyboard 4 having keys 5 and 5b, an alphanumeric strip 6 for displaying the data entered into the apparatus by means of program keys 5 and digital keys 5b of the keyboard 4 and a pushbutton 7 for starting or stopping the apparatus.

The test unit contained within the console 1 is linked by means of three connecting cables 8, 9, 10 with the connecting terminals of the transmission and distribution lines of a subdistribution frame designated hereinafter as a subdistributor.

This test unit is also connected to the subdistributor by means of a service line 16.

The test unit contained within the console 1 will now be described in detail. This test unit essentially comprises a microprocessor which is programmed for storing the data entered into the apparatus by means of the keys of the keyboard 4 and for initiating transmission of a coded signal to the transmission and distribution cables of the pair to be tested and means for detecting said signal in order to check whether the designated constitution is correct or not in the corresponding pairs of the transmission and distribution terminals of the subdistributor.

The results of this test are printed by the printer 3 directly on the technical subscriber-file 3a.

Figure 2:
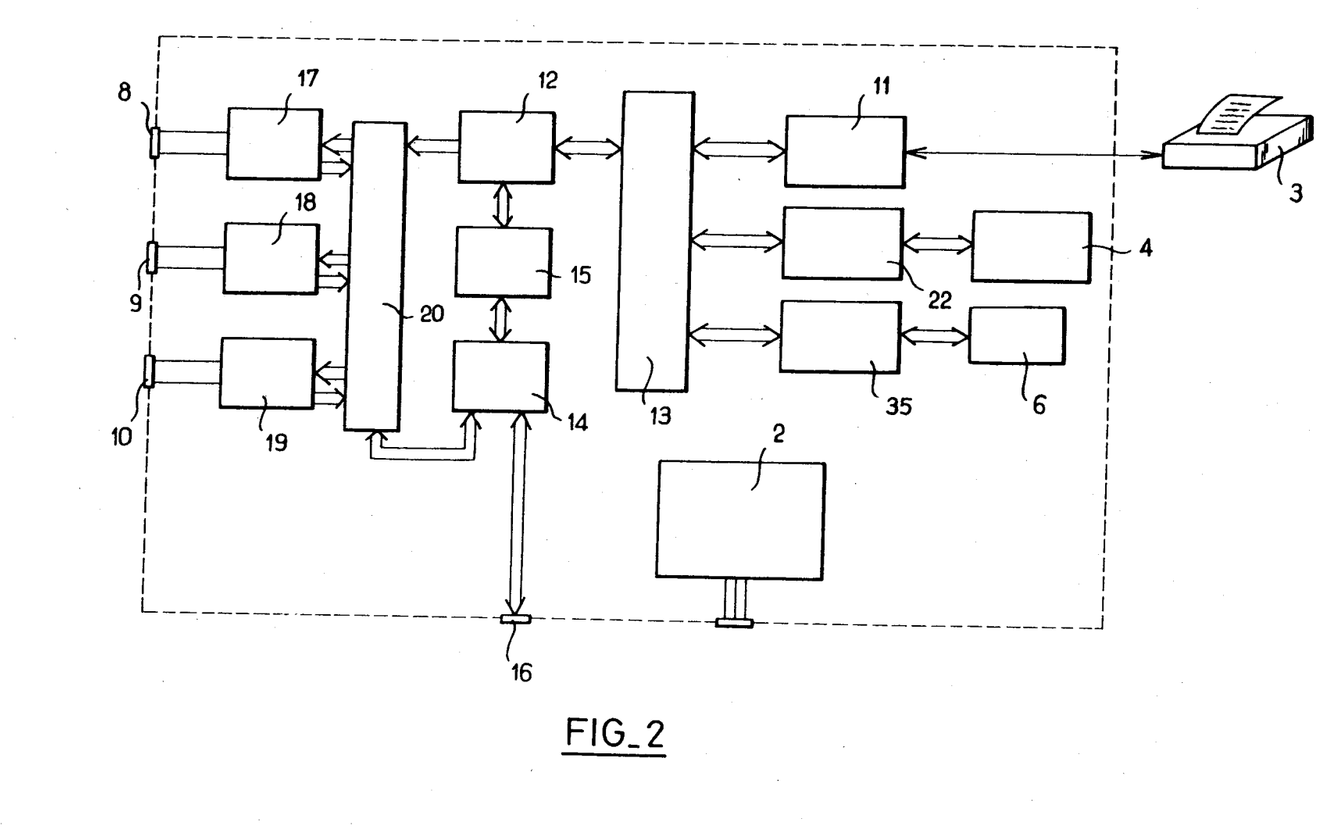
FIG. 2 is a diagram showing the principal components and the connections between these latter, of the test unit of the apparatus in accordance with the invention.
Figure 3:
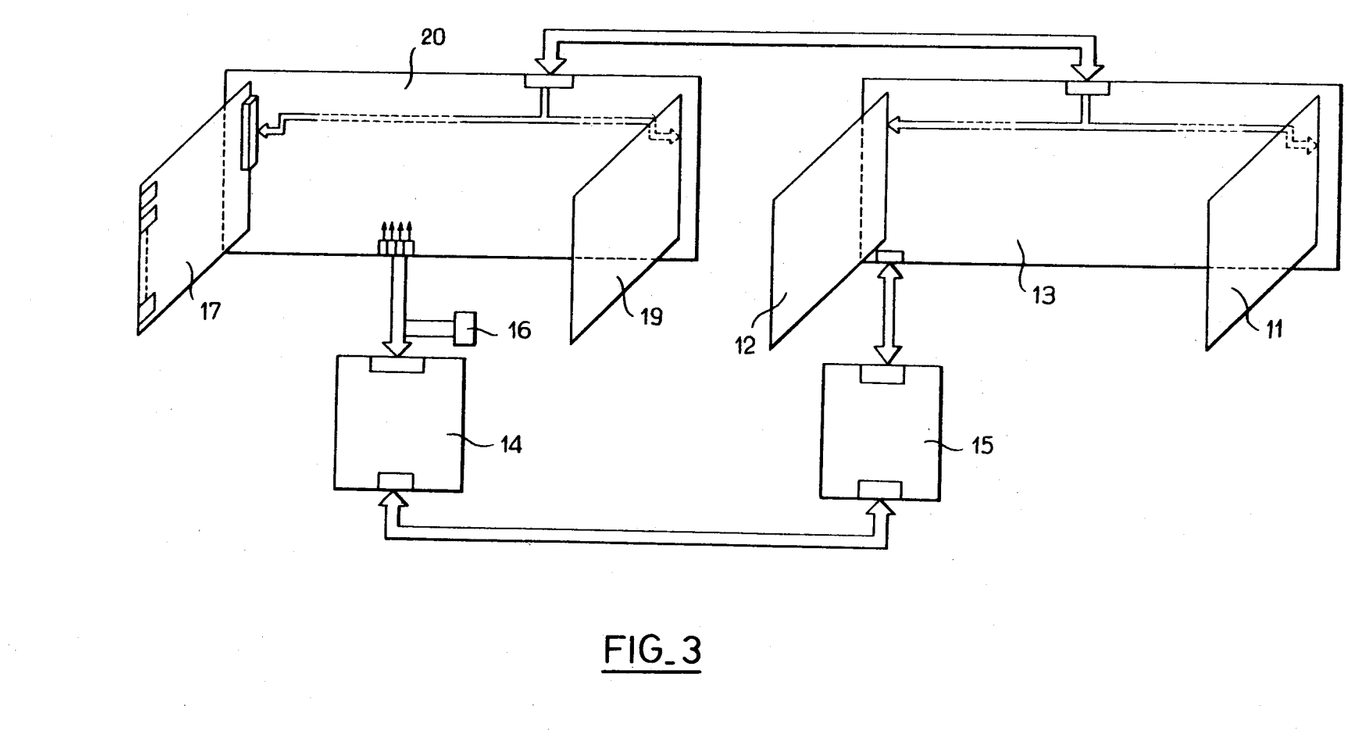
FIG. 3 is a schematic view showing the interconnections between the cards of the test unit.

As shown in FIGS. 2 and 3, the test unit comprises:
a central unit 11 connected to the printer 3 and to a control card 12 via a support card 13;
a connector card 14 which is coupled to the control card 12 by means of a filtering card 15; said card 14 is coupled to the subdistributor via the service line 16;
three selecting cards 17, 18, 19 coupled to the three connecting cables 8, 9, 10 which are joined to the terminals of the subdistributor; these selecting cards 17, 18, 19 are in turn coupled to the control card 12 and to the connector card 14 by means of a support card 20.

The test unit further comprises a keyboard card 22 which is connected on the one hand to the keyboard 4 and on the other hand to the support card 13. The alphanumeric strip 6 is also connected to said support card 13.

FIG. 3 shows in detail the interconnections between the central unit card 11, the support card 13, the control card 12, the filtering card 15, the support card 20, the selecting cards 17, . . . 19 and the connector card 14 which is coupled with the subdistributor.

The central unit card 11 (shown in FIG. 4) comprises a microprocessor 23 having the allotted task of managing the entire test unit as a function of the programs selected by the keyboard 4, a 2K-octet EPROM memory 24 containing the application program, an interface circuit 25 comprising 256 octets of random-access memory 26 for temporary storage of data, a timer 27 for measuring the duration of the signals and three parallel ports 28, 29, 30 which provide the interface with the printer 3.

Figure 4:
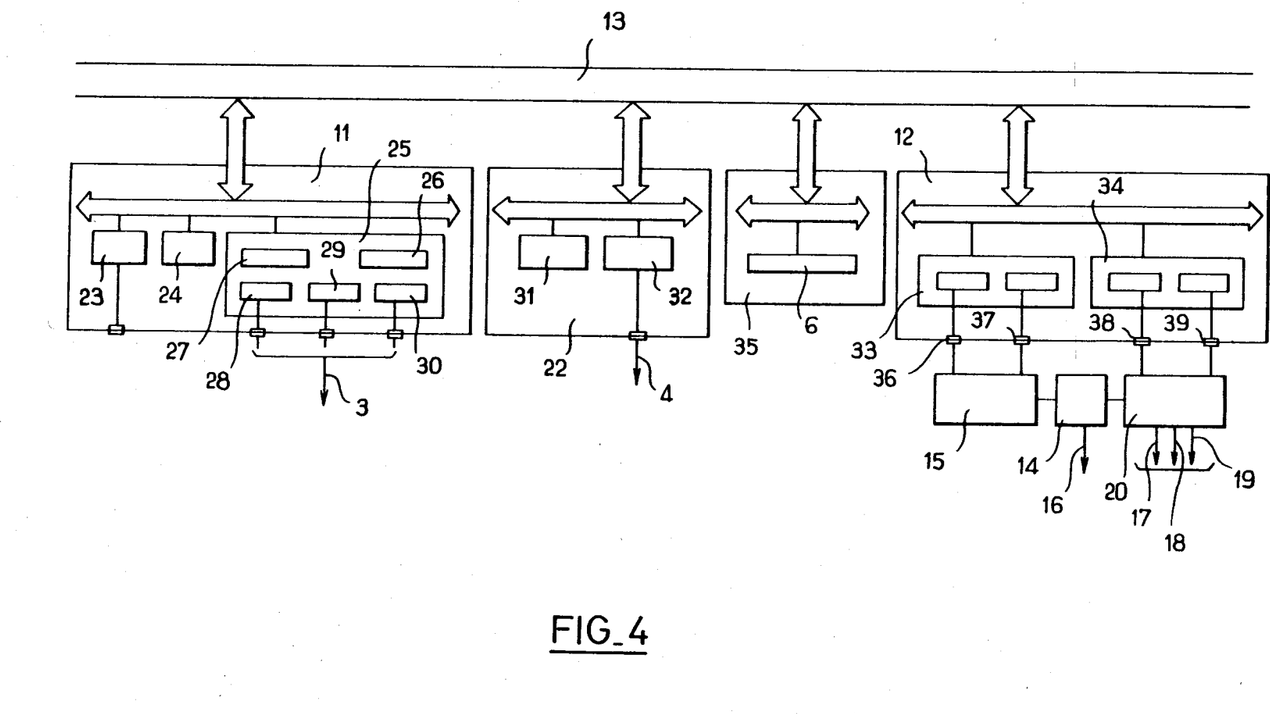
FIG. 4 is a diagram illustrating the principal components of the different cards of the test unit.

The keyboard card 22 connected to the keyboard 4 is equipped with a 2K-octet random-access memory (RAM) 31 and comprises means for storing data relating to results of tests and a circuit 32 for processing the data delivered by the data entry keyboard 4 in order to convert them to ASCII values and achieve interfacing with the data bus of the system.

The control card 12 comprises means for addressing the selecting cards 17, 18, 19 in order to generate the signals employed by the filtering card 15 and connector card 14 linked with the subdistributor and for recording the data delivered by the filtering card 15.

To this end, the aforementioned control card 12 comprises two parallel peripherals 33, 34 for interfacing the data bus of the system with the cards (15, 14, 17, 18, 19) which receive the external signals. One peripheral 33 is connected to the filtering card 15 and the other peripheral 34 is connected to a parent selecting card 20 which serves as a support for the selecting cards 17, 18, 19.

The connection between the peripheral 33 and the filtering card 15 is effected by means of two ports 36, 37. The connection between the peripheral 34 and the card 20 is established by means of two ports 38, 39.

The card 13 serves as a support for the central unit card 11, for the control card 12 and for the keyboard card 22 as well as for a display card 35 which comprises the alphanumeric strip 6.

The aforementioned card 35 has the function of controlling the display of the alphanumeric strip 6 and is directly connected to the data bus of the system. Said card also comprises all the signal processing and decoding logic. The microprocessor 23 deposits on the data bus the ASCII value of the character to be displayed whilst the electronic circuitry of the card 35 performs the remainder of the display control process.

Figure 5:
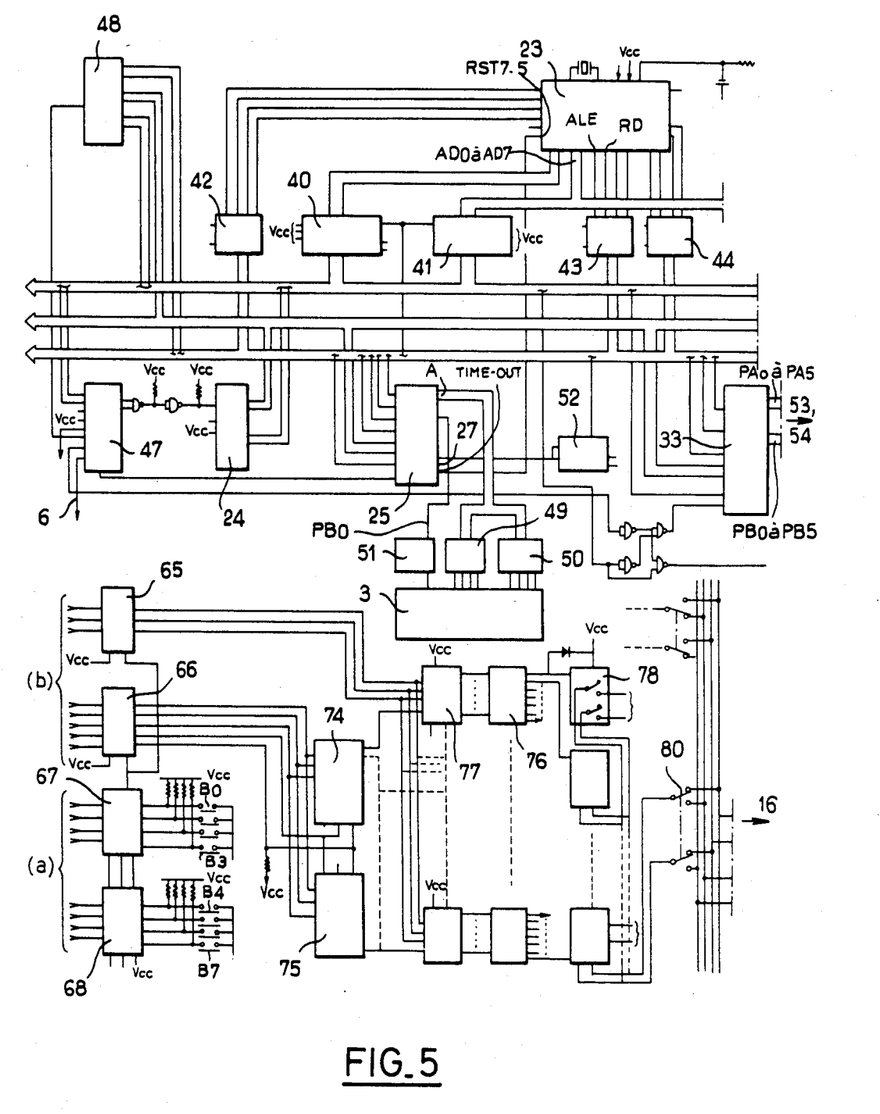
FIGS. 5 and 6 are two complementary views providing detailed diagrams of the various electronic circuits of the test unit of the apparatus in accordance with the invention.
Figure 6:
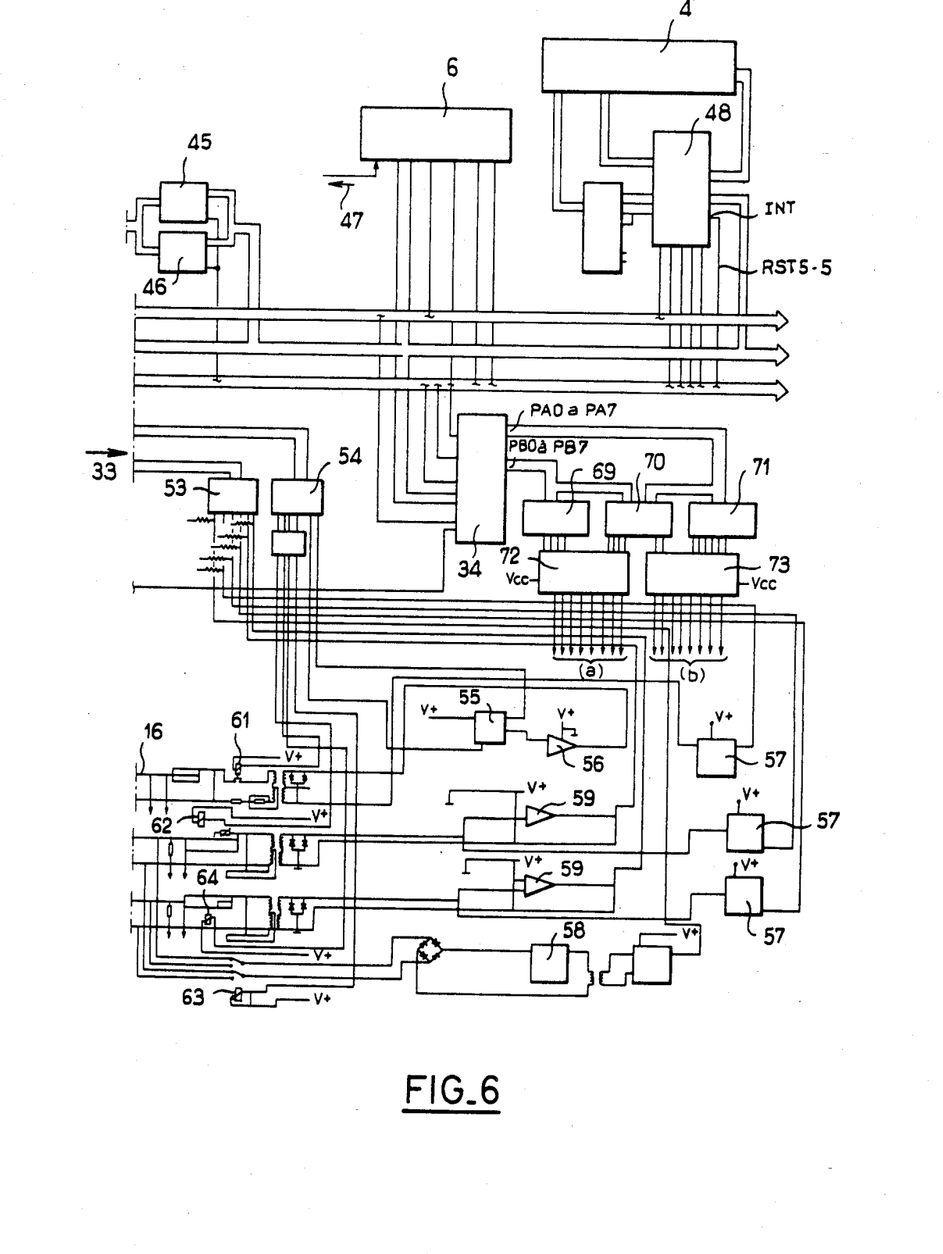

The filtering card 15 comprises a frequency generator 55 (as shown in FIGS. 5 and 6) and frequency detectors 57.

The card 14 which provides a link with the subdistributor comprises a relay 61 for establishing the line connection and numbering, a relay 63 for switching the detector 57 to the transmission or distribution pair and relays 62, 64 for simulating lifting of a telephone handset for transmission or distribution.

The detailed electronic diagram of the test unit is given by way of example in FIGS. 5 and 6 which are complementary.

Composition of the central system

The microprocessor 23 of type 8085 A manufactured by the Intel Corporation is controlled by a 6-MHz quartz crystal and has the allotted task of supervising all operations.

The eight lines AD0 to AD7 of said microprocessor 23 are demultiplexed in order to form on the one hand the address bus comprising sixteen lines (the eight supplementary lines being the lines A8 to A15) and managed by type-8212 unidirectional buffer circuit modules 40, 41 (selected by the test line ALE of the microprocessor) and in order to form on the other hand the data bus through the type-8216 bidirectional buffer circuit modules 45, 46 (oriented by the line RD of the microprocessor). The buffer modules 42, 43, 44 are employed for the test bus.

A decoder 47 constituted by a type-8205 module processes the data for selecting the different modules mentioned above.

The program memory 24 consists of an Intel 2764 EPROM memory having a capacity of 8K octets.

The data memory 48 consists of an Intel 2128 static memory cell having a capacity of 2K octets.

Description of peripherals

The display strips 6 having a capacity of thirty-two alphanumeric characters of type DE 432 and manufactured by the Deco Company is connected directly to the buses of the system.

The sixteen-key digital keyboard 4 is interfaced with an Intel 8279 module 48 which performs the function of decoding the matrix of the keyboard 4. The output INT controls the interrupt input RST 5-5 of the microprocessor 23, this output being valid only at the time of sequences of data entry to the keyboard 4.

The eighty-column printer 3 of type TKL 8510 A marketed by the Tekelek Company is controlled by the Intel 8155 circuit 25 via Intel 74 LS08 circuits 49, 50.

The port A of the circuit 25 and the line PBo which is connected to a circuit 51 are employed for transferring data and control signals.

The Intel 8155 circuit 25 further comprises a timer 27 which makes use of the clock of the microprocessor 23. This clock is divided by two by means of the module 52 of type 74 LS93 A produced by Texas Instruments.

The TIME-OUT output of the timer 27 controls the interrupt input RST 7-5 of the type-8085 A microprocessor 23.

The timer 27 is also utilized in a counting mode for time-control operations relating to the different signals.

Processing of external circuits

The type-8255 A module 33 permits interfacing through Schmitt triggers constituted by the type 74 LS 14 modules 53, 54 with the signal-processing portion.

The lines PA0 and PA1 of the module 33 are connected to a frequency generator 55 constituted by a type XR 2206 circuit.

The line PA1 controls the supply of the frequency-generator module 55 via two transistors designed for on/off switching operation.

The line PA0 initiates switching of frequencies calibrated by resistors connected to the terminals 7 and 8 of the frequency generator 55.

Said generator 55 delivers a signal to the amplifier 56 of the type designated as TDA 2002 which restitutes at the output of a transformer frequencies of 2025 Hz and 2225 Hz for coding the test signal transmitted over the service line 16.

The line PB4 of the module 33 receives the information relating to the presence of a ringing-tone signal on the service line 16.

This detection is performed by circuits 57 of the type designated as XR 2211 and calibrated for continuous decoding of a frequency of 440 Hz.

The lines PB2 and PB3 of the module 33 receive the data delivered by the decoders 57 consisting of XR 2211 circuits to which are assigned the task of detecting the frequencies of the test signal in the transmission and distribution pairs to be checked.

The line PB5 of the module 33 receives the information relating to detection of voltages in the transmission and distribution pairs.

This detection is performed by the type-XR 2211 circuit 57 which reacts to the signals generated by a type-ICM 7555 multivibrator 58 which operates from a voltage of approximately 3 volts.

The lines PB0 and PB1 of the module 33 receive the data delivered by low-pass filters 59 constituted by an active component of type MC 1741 and of passive components having the design function of detecting any presence of frequency in the pairs being tested.

The lines PA2 to PA5 of the module 33 make it possible to carry out the different detection steps by means of relays 61 to 64.

The relay 61 permits establishment of the line connection and numbering.

The relay 63 permits switching of the voltage detection device to the transmission or distribution pair.

The relays 62 and 64 serve to simulate handset hook-off for transmission or distribution.

Device for selecting pairs

The second module 34 of type 8255 A makes it possible to select the pair to be tested by means of the lines PA0 to PA7 and PB0 to PB7.

The number of the cable pair and of the cable inlet section (b) is sent to the bistable circuits 65, 66 of the type 74 LS 174 and the number of the cable terminal (a) is sent to the comparators 67, 68 of the type 74 LS 85 via the Schmitt triggers 69, 70, 71 of the type 74 LS 14 and output buffer-circuit modules 72, 73 of the type 74 S 241.

The comparators 67, 68 of the type 74 LS 85 validate the number of the cable terminal with respect to the coding performed by the contacts Bo to B7 and activate the outputs of the bistable circuits 65, 66 of the type 74 LS 174 which deliver their data to the inlet-section number decoders 74, 75 of the type 74 LS 138 and to the circuit 76 of the type XR 2203 via the cable-pair number decoders 77 of the type 74 LS 259.

The reversing buffer-circuit modules 76 of the type XR 2203 deliver the negative polarity which serves to energize the relay 78, . . . which corresponds to the pair under test and is connected to the device for processing signals either in transmission or in distribution according to the arrangement of the inverter 80.

Programming of the apparatus in accordance with the invention is performed by means of the keys 5 and 5b of the keyboard 4. The keys 5 comprise in succession:
keys V-0 which serve to enter the numerical codes and the constitution numbers;
keys V-1 which serve to specify the cable-terminal correspondence;
keys V-2 which are employed for continuity tests (definition of terminals);
keys V-3 for assignment to transmission and distribution;
a key RET which permits a return to the start-of-cycle position;
a key T/D for assigning a cable terminal to transmission or to distribution;
a key * and keys for entering the digits corresponding to the numerical codes and to the subscriber's constitution numbers.

Starting of programs is performed by means of the keys 5t of the keyboard 4:
a key TC which initiates the performance of the continuity test;
a key DC which initiates performance of the cycle for checking good constitutions.

Figure 7:
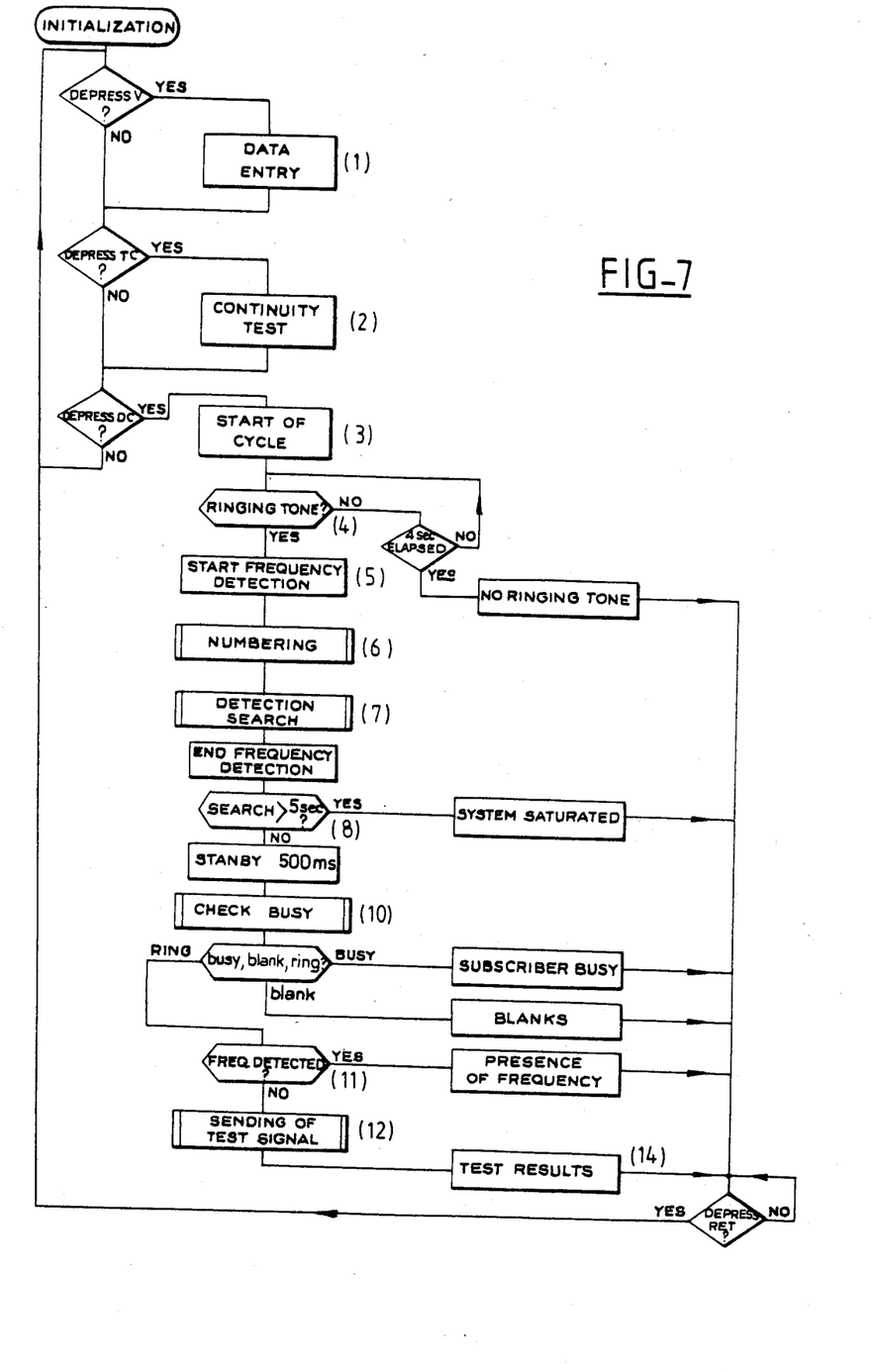
FIG. 7 is a general diagram illustrating the utilization of the apparatus in accordance with the invention.

Referring now to FIG. 7, the use of the apparatus in accordance with the invention involves the following procedure:

1/ By means of the keys 5 and 5b of the keyboard 4, the operator enters into the apparatus the elements for establishing a correspondence between the real distribution and transmission cable terminals and the terminals of the apparatus. Accordingly, the module 32 which is connected to the keyboard 4 performs the function of data input from the keyboard 4. When a key of the keyboard 4 is depressed, the module 32 decodes said data input function and stores this latter in the buffer memory 31. The microprocessor 23 then performs readout of said buffer memory 31 and stores the data in the working memory 26. The same applies to the other data which are entered at the keyboard 4 until the microprocessor 23 identifies the value corresponding to the key RET which indicates that the program V-1 is completed.

2/ The apparatus then performs a check for the presence of a voltage (d.c. or a.c.) in the cable pairs located between the terminals programmed by the operator. In the event that no voltage is detected, the faulty constitution or constitutions are printed by the printer 3 at the head of the list.

This test begins in the same manner as in the case of program V-1 by entering the numbers of the cable pairs to be tested. This constitutes program V-2. The operator then depresses the key TC which announces the start of the continuity test proper. The microprocessor 23 then addresses the circuit 34 located on the control card 12 and communicates to said circuit the number of the pair to be tested. This value is again found on the output ports 38, 39 of the circuit 34, said ports being in turn linked with the connectors of the parent selecting card 20 which is linked with the selecting cards 17, 18, 19. In consequence, the pair number again appears in the circuits of these selecting cards 17, 18, 19. The selecting card 17, 18 or 19 which identifies the pair therefore selects one of the relays 78 which brings the pair into a physical relationship with the connector card 14. The pair is therefore again connected to the filtering card 15 through the intermediary of said connector card 14. By means of the relay 63, said pair is again in contact with the device for detecting voltage on the filtering card 15. If the circuit 58 of the filtering card 15 detects a voltage, it restitutes a logic data item on the output of said card which is connected to the control card 12 by means of one of the ports 36, 37 of the circuit 33. At this moment, the microprocessor 23 performs a read operation on said circuit 33 and, if it finds the logic level 1 on the line of the corresponding port, it accordingly deduces from this finding that the voltage is correct. If it finds a level 0, it deduces that the voltage on the pair which it has just tested is zero. This result is stored in memory and the microprocessor 23 transmits the number of the following pair to the circuit 34 and the test begins again until the last number of the pairs to be tested has been attained.

3/ The operator enters the subscriber number at the keyboard 4. The operator then enters the numbers of the transmission and distribution constitutions which should theoretically correspond to this subscriber number. The operator then depresses a start-of-cycle key DC. From this moment, the test takes place automatically until the final step. The procedure of this test is identical with that of paragraph 1/ above in regard to data entries at the keyboard. The different elements and data which are entered at the keyboard are stored in the random-access memory 26 constituted by 256 octets of RAM located on the central unit card 11.

4/ The apparatus first tests the service line 16 at the calling subscriber's end in order to check whether it obtains the ringing-tone signal (440 Hz plus or minus 1% continuous signal) before a time interval of four seconds has elapsed. If this signal is not received, a capital T is printed in one of the columns and the constitution number in distribution is printed in another column of the technical subscriber-file placed in the printer 3.

The display strip 6 displays "no ringing-tone" and the operator passes to the next number.

During the performance of this test and of the following tests, the timer 27 generates an interrupt at intervals of one millisecond in the direction of the microprocessor 23. The functions of timing and control of time-duration of a signal are performed by initializing a memory at the value corresponding to the controlled time-duration, this memory being decremented at intervals of one millisecond. At the time of the test under consideration, the microprocessor 23 begins to load the memory with the value corresponding to a time-duration of four seconds. The microprocessor then closes the relay 61 located on the connector card 14 by means of the ports of the circuit 33 located on the control card 12 and will check on another port connected with the filtering card 15 whether it obtains a data item before four seconds have elapsed. Detection of the presence of a ringing tone represented by a 440 Hz signal is achieved by means of the circuit 57 of the filtering card.

The conclusions of this test are printed as indicated in the preceding paragraph.

5/ The apparatus then starts a zero-frequency detection test at the called subscriber's end on the transmission and distribution pairs. The microprocessor 23 selects the two transmission and distribution pairs corresponding to the subscriber number to be tested.

The selection takes place in the same manner as in the continuity test. The two cable pairs to be tested are therefore connected by means of relays 78 to each selecting card 17, 18, 19 (one of the cards comprises the transmission pair and the other card comprises the distribution pair) and by means of connectors of the parent selecting card 20 to the filtering card 15 via the connector card 14. The circuits 57 of the filtering card 15 are therefore in contact with the two pairs to be tested. As soon as a frequency appears on one of the pairs, the terminals of the filtering card 15 which are connected to the ports of the circuits 33 of the control card 12 change to the logic level 0 (that is, +5 volts) and when the microprocessor 23 subsequently reads the buffer registers of the peripheral circuit 33, it will find the value 1 in the event of frequency detection.

6/ The system transmits the subscriber number to the service line 16 at the calling subscriber's end. This step must last at least 3.5 seconds. Transmission of the subscriber number takes place by closing of the relay 61 located on the connector card 14. This card is controlled by means of a line which passes through the filtering card 15 and is connected to the line PA2 of the peripheral circuit 33. The microprocessor 23 therefore transmits successively the logic value 0 and the logic value 1 on this line in order to supply current or interrupt the supply of current to the relay 61. The numbering step has a minimum duration of 3.5 seconds; this means that, if the number received consisted only of values equal to 1, the opening-closing time would be equal to 0.1 second per number. The addition of opening-closing times for each number and of the intertrain intervals make it possible to attain a numbering time which exceeds 3.5 seconds. This length of time is necessary in order to take into account at the level of the zero-frequency detections a ringing signal which has appeared on the called subscriber line in the event that this line is in a blank stage which can last 3.5 seconds. The duration of orders sent to the relay 61 by the microprocessor 23 is controlled by decrementation of a memory initially loaded with the relay opening or closing time interval and the time base delivered by the timer 27 located on the card 11 which operates in the interrupt mode.

7/ The apparatus detects the presence of the 440 Hz search signal at the called subscriber's end on the service line 16.

This detection is performed on the one hand by detecting the presence or absence of a frequency of 440 Hz in the same manner as the ringing-tone detection since the same frequency is involved. In addition, the microprocessor 23 checks the presence of data on one port of the peripheral circuit 33 during a period of time equal to the period of the signal. This time interval is defined by a counting memory initialized at 0 and by the time base delivered by the timer 27.

8/ The apparatus detects the disappearance of the search signal before a time interval of five seconds has elapsed. If the duration of the signal exceeds five seconds, an R is printed in one of the columns and the constitution number is printed in another column of the file.

The display strip 6 indicates "system saturated" and the operator goes on to the next number. Detection of loss of the search signal is carried out by detecting a high or low signal of a period which is longer than 65 milliseconds or shorter than 35 milliseconds. The five-second time interval is obtained by initialization of a memory at this value and by decrementation of the memory by the microprocessor 23. When the content of this memory is 0, the five-second time interval is attained.

The detection of a high or low signal as well as the transition from one to the other are carried out at intervals of one millisecond. A memory is incremented for defining the duration either of a high signal or of a low signal. The microprocessor 23 performs a read from this memory. If the memory content is on the one hand higher than 65 or on the other hand lower than 35 between two changes of state of the signal, the microprocessor 23 accordingly deduces the search signal loss therefrom. The relay 61 remains closed throughout the duration of these tests.

9/ The apparatus cancels the zero frequency check at the called subscriber's end. This cancellation takes place simply by virtue of the fact that the microprocessor 23 no longer reads the lines PB0 and PB1 of the peripheral circuit 33.

10/ The apparatus then measures the pulse-interval duration of the 440 Hz signal. If the duration of the signal exceeds 700 milliseconds, the apparatus deduces a ringing condition at the subscriber station and goes on to stage 11 described hereinafter. In the event that the signal has a duration of less than 700 milliseconds, a second measurement is performed. If the duration of the signal is longer than 700 milliseconds, the apparatus deduces a ringing condition at the subscriber station and goes on to the next stage. Should this not be the case, the apparatus accordingly deduces a busy condition (440 Hz signal) with pulse intervals of 500 milliseconds ±100 milliseconds and prints a zero in one of the columns and the distribution constitution number is printed in another column of the file.

The display strips 6 indicates "subscriber busy" and the operator goes on to the following number. If neither of the two above-mentioned signals has been detected by the apparatus within a period of 3.6 seconds after the start of stage 10, the apparatus accordingly deduces a blank. A B and the distribution constitution number are printed on the file. The display strip indicates "blank" and the operator goes on to the next number.

Measurement of the different signals mentioned above is performed as already indicated in paragraph 7 except for the fact that the memory is compared with different values corresponding to the different signal-pulse intervals in each case.

11/ If a frequency has been detected from the initial instant of the zero-frequency checking operation, the apparatus prints an F and the distribution constitution number on the file. The display strip 6 then indicates "presence of frequency". The operator then goes on to the next number.

Should this not be the case, the operator passes to stage 12 hereunder.

12/ The apparatus performs a loop connection at the called subscriber's end with the distribution point (this action is equivalent to a "hook-off" or lifting of a handset from its cradle). A coded signal (5 bits at 5 milliseconds/bits) is transmitted to the service line 16 at the calling subscriber's end.

Accordingly, the microprocessor 23 closes the relay 62 located on the connector card 14, which corresponds to a distribution loop connection. If the microprocessor fails to obtain reading of the coded signal after two attempts, it initiates closing of the relay 64 of said connector card 14 and will carry out a read operation on the corresponding decoder 57.

13/ The apparatus reads said signal at the called subscriber's end on the transmission and distribution terminals. Identification of the signal produces a changeover to stage 14 below.

Non-identification of the signal at the distribution point initiates transmission of a second coded signal.

Reading of the test signal again takes place at the transmission and distribution points. If this second signal is identified at the distribution point, the system takes into account the result obtained at the transmission point and goes on to stage 14 below.

In the event of the contrary, the system carries out a loop connection with the transmission point, transmits a third signal, performs reading of the transmission point and goes on to stage 14 hereunder.

14/ The apparatus displays and prints the messages according to the results of the test.

The messages to be printed are contained in the memory 24 (2K EPROM) of the central unit card 11. The messages are communicated to the printer 3 by means of the circuit 25 of the card 11 in the form of characters coded in ASCII values. Management of the different message words and of the different printing modes is contained within the program. A certain number of variables and data relating to the test proper and the result of the test are searched within the random-access memory 31 (2K octets of RAM) in order to complete the content of the messages stored in the memory 24.

When the printer receives the ASCII characters, it prints one character and immediately sends a reply to the microprocessor 23 via the circuit 25 and this latter sends the following character. When printing is completed, the program re-starts and awaits entry of a new number. In the event of failure to obtain the number because a busy condition or a frequency has been detected on the lines, this number will have to be called again.

The aforementioned stages of performance of the different tests are illustrated in the diagram of FIG. 7.

As will readily be apparent, the invention is not limited to the examples described in the foregoing and many modifications may accordingly be contemplated without thereby departing either from the scope or the spirit of the invention.

What is claimed is:

1. An apparatus for automatically checking the correspondence between the numerical codes of telephone subscribers and the different transmission and distribution identification codes of the pair of cables assigned to each subscriber, said apparatus being intended to be connected to the power supply system and to the connecting terminals of the transmission and distribution cables of a subdistribution frame, wherein said apparatus comprises:
   means (4, 5) for successively entering into the apparatus the numerical codes and constitution numbers of subscribers from a data source of numerical codes and constitution numbers to be checked;
   connectors (8, 9, 10) to be attached to the terminals of a subdistribution frame;
   a test unit comprising a microprocessor (23) which is programmed for storing said numerical codes and constitution numbers entered into the apparatus and for initiating transmission of a coded signal to said transmission and distribution cables of the said pairs of cables to be tested, means for detecting said signal in order to check whether the designated constitution numbers correspond to the said pairs of cables to be tested;
   means (3) for displaying the results of said test.

2. An apparatus according to claim 1, wherein the means for displaying the results are constituted by a printer (3) for automatically printing the results of the test on the said data source of numerical codes and constitution numbers.

3. An apparatus according to claim 1, wherein the means for entering data into the apparatus comprise a keyboard (4) constituted by keys (5, 5b) which include numbered keys (5b) for entering the subscriber's numerical code and constitution numbers and keys (5) for selecting one of the following programs:
   a program for entering the numerical codes and constitution numbers of subscribers;
   a program for specifying the correspondence of subdistribution-frame terminals;
   a program of continuity testing or definition of terminals;
   a program for assignment of a terminal for transmission or distribution;
   a program for returning to said program for entering the numerical codes and constitution numbers of subscribers.

4. An apparatus according to claim 3, wherein said apparatus comprises a module (32) for decoding the data entered into the apparatus by means of the keys (5, 5b) of the keyboard (4) and storing said data in a buffer memory (31) and wherein the microprocessor (23) is programmed for reading said buffer memory (31) and storing the data in a working memory (26).

5. An apparatus according to claim 4, wherein said apparatus comprises means for detecting a voltage indicative of a said correspondence and means for verifying a said voltage by means of the keys (5, 5b) of the keyboard (4).

6. An apparatus according to claim 5, wherein said microprocessor (23) is programmed for communicating the number of the pair to be tested to a circuit (34) which is connected to selecting means (17, 18, 19), said selecting means being adapted to connect said pair to a voltage detector (58) which is linked with a circuit (33), wherein the microprocessor (23) is programmed for performing a read operation on said circuit (33) and deducing therefrom either the existence or non-existence of a voltage in the pair under test, for storing this result in memory and for successively communicating numbers of the pairs to be tested next on the circuit (34).

7. An apparatus in accordance with claim 4, wherein said apparatus comprises means for testing a service line (16) at the calling subscriber's end in order to detect a frequency corresponding to a ringing-tone signal during a predetermined time interval.

8. An apparatus according to claim 7 and a timer having a time base, wherein microprocessor (23) is programmed for communicating said predetermined time interval to a memory whose content is decremented by following the time base of the said timer (27) and for initiating closure of a relay in order to connect said service line to a frequency detector (57) which is associated with a circuit (33), wherein the microprocessor is programmed for reading the circuit (33), for deducing therefrom the existence or non-existence of a signal having a predetermined frequency prior to expiry of the predetermined time interval and initiating printing of the result of this test by means of the printer.

9. An apparatus according to claim 7, wherein said apparatus comprises means for checking the detection of a zero frequency in the transmission and distribution pairs at the called subscriber's end.

10. An apparatus according to claim 9, wherein the microprocessor (23) is programmed for selecting a set transmission and distribution pairs corresponding to the subscriber number to be tested, for initiating closure of a relay in order to put the pair to be tested into communication with the frequency detector (57) which is connected to the circuit (33), wherein the microprocessor (23) is programmed for performing a read operation on the circuit (33), for deducing therefrom the existence or non-existence of a zero frequency and interrupting the operation in the event of detection of a non-zero frequency.

11. An apparatus according to claim 4, wherein said apparatus comprises means for storing in memory the numerical codes of the said pair of cables to be tested and for detecting the existence of a predetermined frequency on the calling subscriber's service line (16) and for initiating the printing of the result of this test on the printer if the time-duration of the signal corresponding to the aforementioned frequency exceeds a predetermined value, which indicates that the said apparatus is saturated.

12. An apparatus according to claim 4, wherein said apparatus comprises means for detecting whether the pair of cables to be tested is busy.

13. An apparatus according to claim 2, wherein the test unit comprises a central unit card (11) including a microprocessor (23) so programmed as to control the entire said apparatus as a function of the programs selected, an EPROM memory (24) containing an application program, an interface circuit (25) comprising 256 octets of RAM memory (26) for temporary storage of data, means (27) for measuring the time-duration of signals and three parallel ports (28, 29, 30) providing the interface with the printer (3).

14. An apparatus to claim 13, wherein the test unit further comprises a data bus, a keyboard card (22) equipped with a RAM (31) having a capacity of 2K octets and comprising means for storing the data relating to results of tests and a circuit (32) for processing the data delivered by data entry means (4) in order to convert said data to ASCII values and to provide interfacing with the said data bus of the apparatus.

15. An apparatus according to claim 13, wherein said apparatus further comprises a control card (12), a filtering card (15), a subdistributor connection card (14) and selecting cards (17, 18, 19) each coupled to the connectors (8, 9, 10) to be attached to the terminals of the subdistribution frame, the control card (12) being provided with means for addressing the selecting cards (17, 18, 19) and for generating the signals employed by the filtering card and the subdistributor connection card and for recording the data delivered by the filtering card (15).

16. An apparatus according to claim 15, wherein the control card (12) comprises two parallel peripheral circuits (33, 34) for interfacing the said data bus of system with the cards (15, 14, 17, 18, 19) for receiving external signals, one of said peripheral circuits (33) being connected to the filtering card (15) and the other peripheral circuit (34) being connected to a parent selecting card (20) which serves as a support for the selecting cards (17, 18, 19).

17. An apparatus according to claim 14, wherein said apparatus comprises a parent card (13) which serves as a support for the central unit card (11), for the control card (12), for a keyboard card (22), and for a card (35) provided with an alphanumeric strip (6) which displays the data entered into the apparatus.

18. An apparatus according to claim 15, wherein the filtering card (15) comprises a frequency generator (55) and frequency detectors (57).

19. An apparatus according to claim 18, wherein the connector card (14) which provides a connection with the subdistribution frame comprises a relay (61) for establishing a connection with the line and numbering of said line, a relay (63) for switching the frequency detector (57) to the transmission or distribution pair, and relays (62, 64) for simulating off-hook or lifting of a telephone handset for transmission or distribution.

* * * * *